United States Patent
Kudo et al.

(10) Patent No.: US 11,423,632 B2
(45) Date of Patent: Aug. 23, 2022

(54) DEVICE AND METHOD FOR DETERMINING SURFACE IRREGULARITIES WITH IRRADIATION ANGLE

(71) Applicant: NEC CORPORATION, Tokyo (JP)

(72) Inventors: Yuta Kudo, Tokyo (JP); Rui Ishiyama, Tokyo (JP); Toru Takahashi, Tokyo (JP); Kengo Makino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 128 days.

(21) Appl. No.: 16/757,806

(22) PCT Filed: Sep. 26, 2018

(86) PCT No.: PCT/JP2018/035813
§ 371 (c)(1),
(2) Date: Apr. 21, 2020

(87) PCT Pub. No.: WO2019/082584
PCT Pub. Date: May 2, 2019

(65) Prior Publication Data
US 2021/0342617 A1 Nov. 4, 2021

(30) Foreign Application Priority Data
Oct. 24, 2017 (JP) .............................. JP2017-205133

(51) Int. Cl.
*G06V 10/145* (2022.01)
*G06T 7/73* (2017.01)
(Continued)

(52) U.S. Cl.
CPC ............. *G06V 10/145* (2022.01); *G01B 5/28* (2013.01); *G01B 11/30* (2013.01); *G06T 7/73* (2017.01);
(Continued)

(58) Field of Classification Search
CPC .... G06K 9/2036; G06K 9/00577; G01B 5/28; G01B 11/30; G06T 7/73; H04N 5/2354
See application file for complete search history.

(56) References Cited

U.S. PATENT DOCUMENTS 5,835,220 A * 11/1998 Kazama .................... G01J 4/04
356/369
5,929,994 A * 7/1999 Lee ........................... G01J 4/00
356/364
(Continued)

FOREIGN PATENT DOCUMENTS

JP  2005-201880 A  7/2005
JP  2015-232487 A  12/2015
(Continued)

OTHER PUBLICATIONS

Japanese Office Action for JP Application No. 2019-550882 dated Apr. 6, 2021 with English Translation.
(Continued)

*Primary Examiner* — Richard T Torrente
(74) *Attorney, Agent, or Firm* — Sughrue Mion, PLLC (57) ABSTRACT

The present invention relates to an information processing device used in an image capture device that illuminates an object with an illuminating unit and images light reflected from the object as a reflection image with an imaging unit. The information processing device includes an irradiation angle determining unit configured to determine an irradiation angle when the illuminating unit illuminates the object based on a tilt statistic that is a value corresponding to tilt distribution of irregularities formed on the surface of the object.

9 Claims, 9 Drawing Sheets (51) Int. Cl.
    *G01B 5/28*     (2006.01)
    *G01B 11/30*     (2006.01)
    *H04N 5/235*     (2006.01)
    *G06V 20/80*     (2022.01)
    *G06T 1/00*     (2006.01)

(52) U.S. Cl.
    CPC ........... *G06V 20/80* (2022.01); *H04N 5/2354* (2013.01); *G06T 1/00* (2013.01)

(56) References Cited

U.S. PATENT DOCUMENTS 6,157,444 A * 12/2000 Tomita ............... G01N 21/9501
    356/237.1

7,061,598 B1 * 6/2006 Bevis ...................... G01N 21/47
    356/237.1
2009/0177428 A1 * 7/2009 Iden ...................... G01B 11/306
    702/94

FOREIGN PATENT DOCUMENTS

| | | |
|---|---|---|
| JP | 5866586 B1 | 2/2016 |
| WO | 2014/021449 A1 | 2/2014 |
| WO | 2014/163014 A1 | 10/2014 |

OTHER PUBLICATIONS

International Search Report of PCT/JP2018/035813 dated Dec. 11, 2018 [PCT/ISA/210].

* cited by examiner

$\Theta < 2\alpha$

Fig.5B

$\Theta = 2\alpha$

Fig.5C $\Theta > 2\alpha$

DEVICE AND METHOD FOR DETERMINING SURFACE IRREGULARITIES WITH IRRADIATION ANGLE

CROSS REFERENCE TO RELATED APPLICATIONS

This application is a National Stage of International Application No. PCT/JP2018/035813, filed Sep. 26, 2018, claiming priority to Japanese Patent Application No. 2017-205133, filed Oct. 24, 2017, the contents of all of which are incorporated herein by reference in their entirety.

TECHNICAL FIELD

The present invention relates to an information processing device, an information processing method, and a recording medium.

BACKGROUND ART

A technology called object fingerprint authentication is known that allows identification and management of individual products in the following manner: firstly acquire, as an image, a random pattern formed by fine irregularities naturally occurring at a fine level equal to or less than surface roughness defined as a quality standard or fine irregularities imparted at processing, specifically, fine irregularities varying for each individual object naturally occurring at every processing on a product material surface, with an imaging device such as a camera, and then recognize the acquired image.

One example of such a technology is illustrated in Patent Document 1. Patent Document 1 describes an information acquisition and identification system that collates a satin pattern extracted from an image obtained by imaging the satin pattern formed on a part or a product with a previously stored image feature and identifies the part or the product. Patent Document 1 also describes using an imaging aid having a light source unit when imaging the satin pattern. According to Patent Document 1, it is desirable to perform imaging under the same illumination conditions at all times.

Further, a related technique is illustrated in Patent Document 2, for example. Patent Document 2 describes an inspecting illumination device for detection of a minute defect. According to Patent Document 2, the inspecting illumination device can change the shape, size, and tilt angle of the irradiation solid angle of inspection light in accordance with change occurring at a feature point, that is, a defect site of an inspection target.

Patent Document 1: International Publication WO2014/0163014
Patent Document 2: Japanese Patent No. 5866586

In order to perform individual identification and collation of an object with high accuracy by using an object fingerprint, that is, the abovementioned random pattern obtained by imaging fine irregularities on the surface of the object, it is desirable to image the irregularities with high contrast. In the case of applying the technique described in Patent Document 1, in order to image the irregularities with high contrast as described above, it is necessary to select and adjust an illumination device while actually capturing an image of a target part, and therefore, there is a problem that an adjustment cost before introduction is required. Moreover, there are various methods for processing products and various conditions of product surfaces. Therefore, in the case of applying the technique described in Patent Document 1, it is necessary to determine an optimum irradiation solid angle every time an object is changed. Thus, in the case of applying the technique described in Patent Document 1, there is a problem that in order to image the irregularities with high contrast, it is necessary to actually capture an image of an object under various illumination conditions and evaluate the image or identification accuracy by experiments. Furthermore, there is a problem that in order to check whether or not a pattern having randomness for each individual has been captured, a high operation cost is required for imaging a large number of individual objects and performing a collation experiment.

Further, as for the technique described in Patent Document 2, it is still necessary to adjust the device while capturing an image of the part in order to determine an irradiation solid angle.

Thus, there is a problem that it is difficult to easily acquire an image with high cost.

SUMMARY

Accordingly, an object of the present invention is to provide an information processing device, an information processing method, and a recording medium which solve the problem that it is difficult to easily acquire an image with high contrast.

In order to achieve the above object, an information processing device according to an aspect of the present invention is an information processing device used in an image capture device that illuminates an object with an illuminating unit and images light reflected from the object as a reflection image with an imaging unit. The information processing device includes an irradiation angle determining unit configured to determine an irradiation angle when the illuminating unit illuminates the object based on a tilt statistic that is a value corresponding to tilt distribution of irregularities formed on a surface of the object.

Further, an information processing method according to another aspect of the present invention is an information processing method executed by an information processing device used in an image capture device that illuminates an object with an illuminating unit and images light reflected from the object as a reflection image with an imaging unit. The information processing method includes acquiring a tilt statistic that is a value corresponding to tilt distribution of irregularities formed on a surface of the object and, based on the acquired tilt statistic, determining an irradiation angle when the illuminating unit illuminates the object.

Further a recording medium according to another aspect of the present invention is a computer-readable medium storing a program including instructions for causing an information processing device to realize an irradiation angle determining unit. The information processing device is used in an image capture device that illuminates an object with an illuminating unit and images light reflected from the object as a reflection image with an imaging unit. The irradiation angle determining unit is configured to determine an irradiation angle when the illuminating unit illuminates the object based on a tilt statistic that is a value corresponding to tilt distribution of irregularities formed on a surface of the object.

With the configurations as described above, the present invention can provide an information processing device, an information processing method, and a recording medium which solve the problem that it is difficult to easily acquire an image with high contrast.

EXAMPLE EMBODIMENTS

First Example Embodiment

Figure 1:
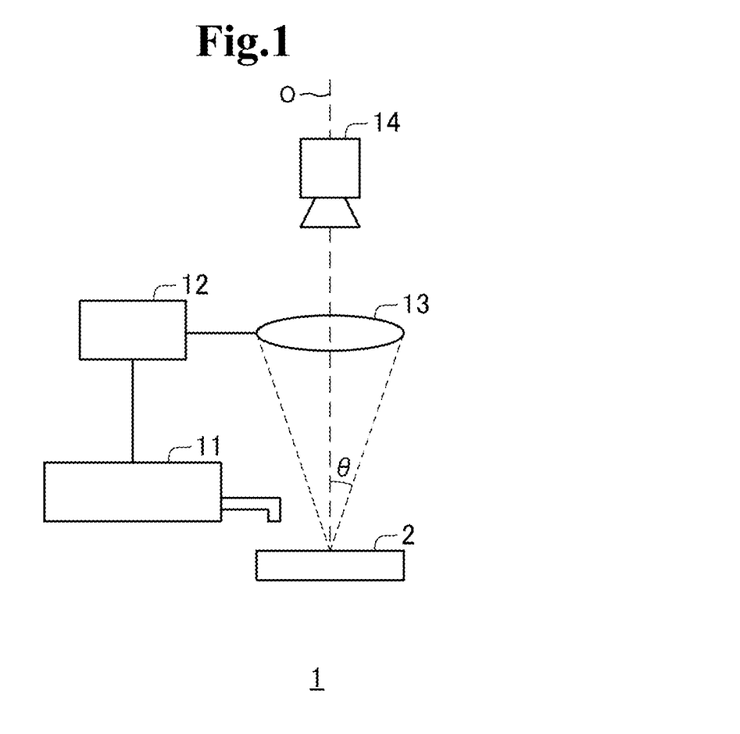
FIG. 1 is a view showing an example of the overall configuration of an image capture system according to a first example embodiment of the present invention.
Figure 2:
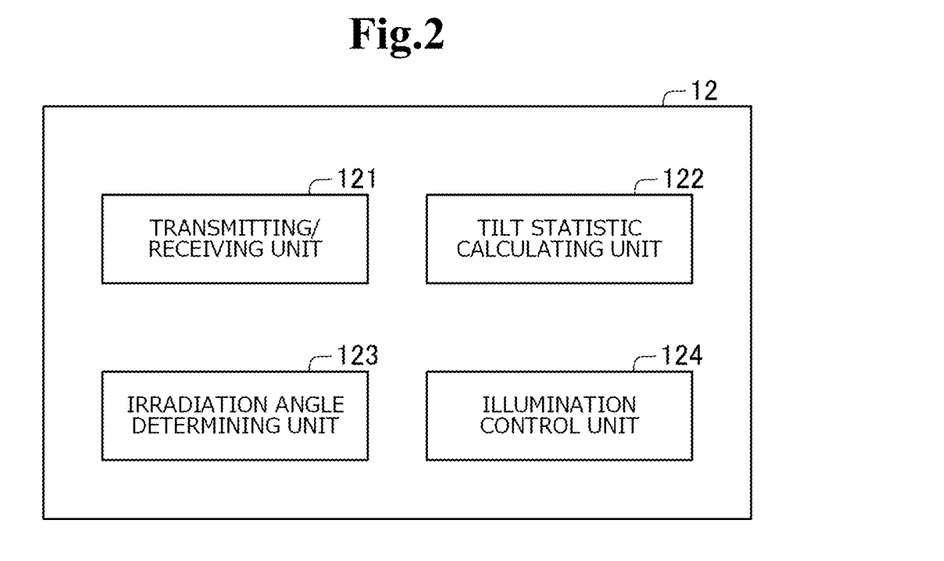
FIG. 2 is a block diagram showing an example of the configuration of a control unit shown in FIG. 1.
Figure 3:
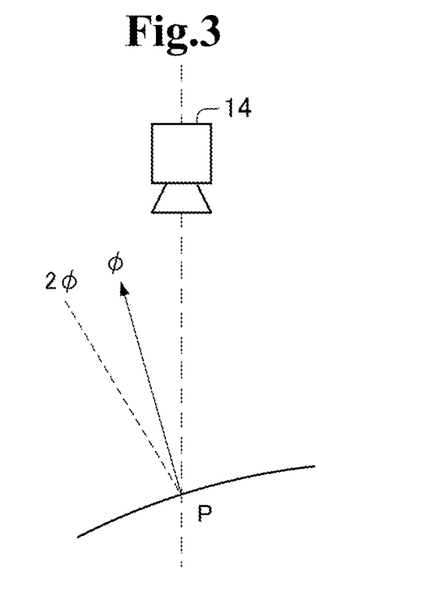
FIG. 3 is a view showing an example of the relation between an irradiation angle and lightness/darkness.
Figure 4:
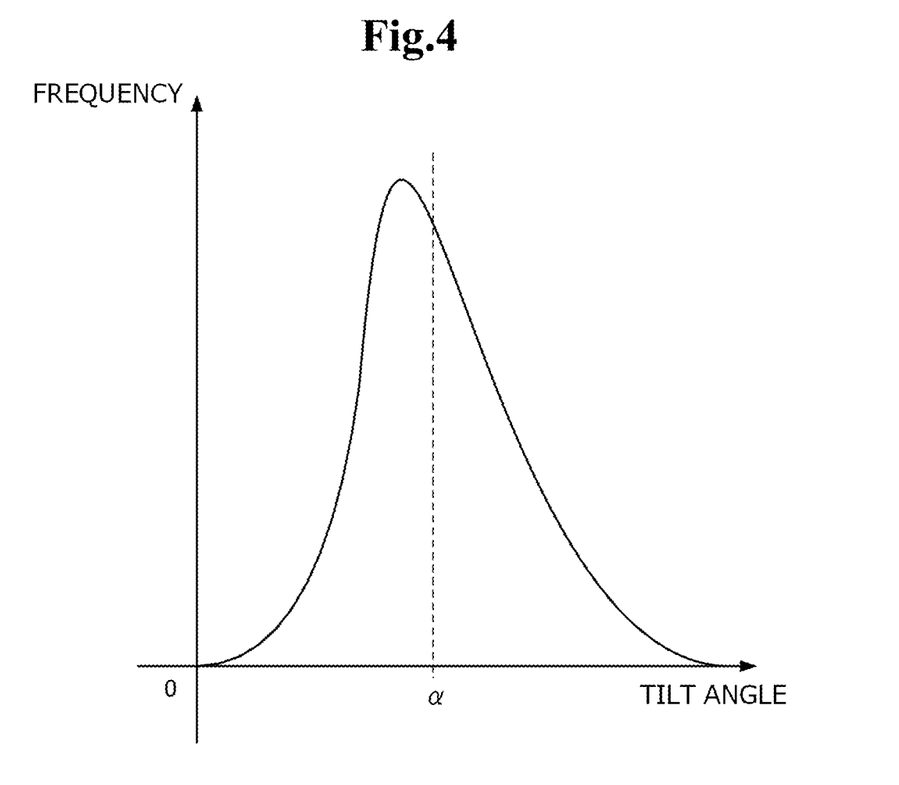
FIG. 4 is a view showing an example of tilt distribution.
Figure 5A:
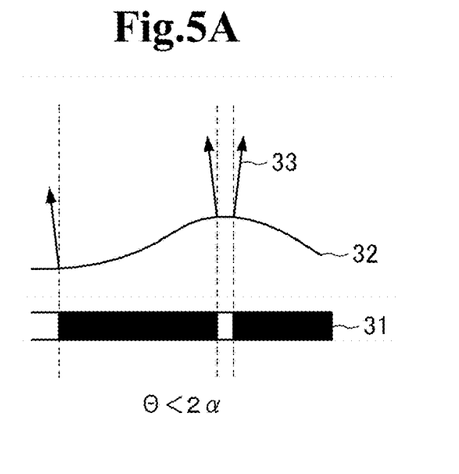
FIG. 5A is a view showing an example of change of an irradiation angle and a captured image in the case of $\theta<2\alpha$.
Figure 5B:
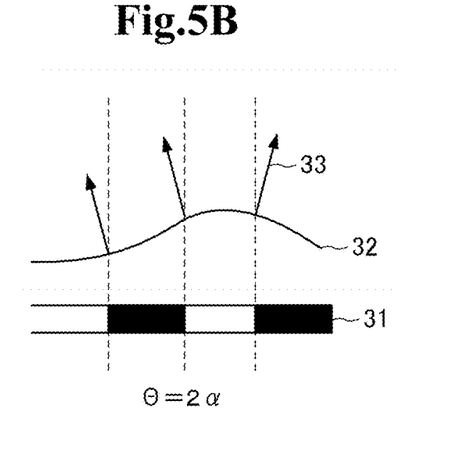
FIG. 5B is a view showing an example of change of an irradiation angle and a captured image in the case of $\theta=2\alpha$.
Figure 5C:
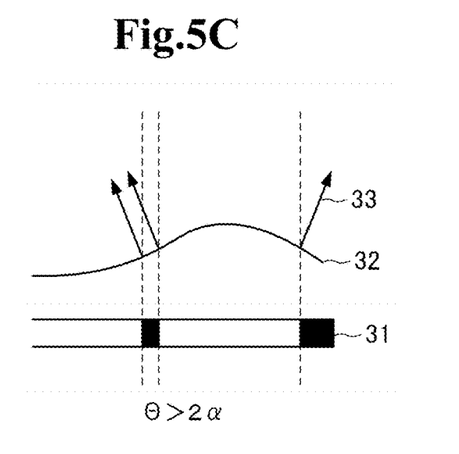
FIG. 5C is a view showing an example of change of an irradiation angle and a captured image in the case of $\theta>2\alpha$.
Figure 6A:
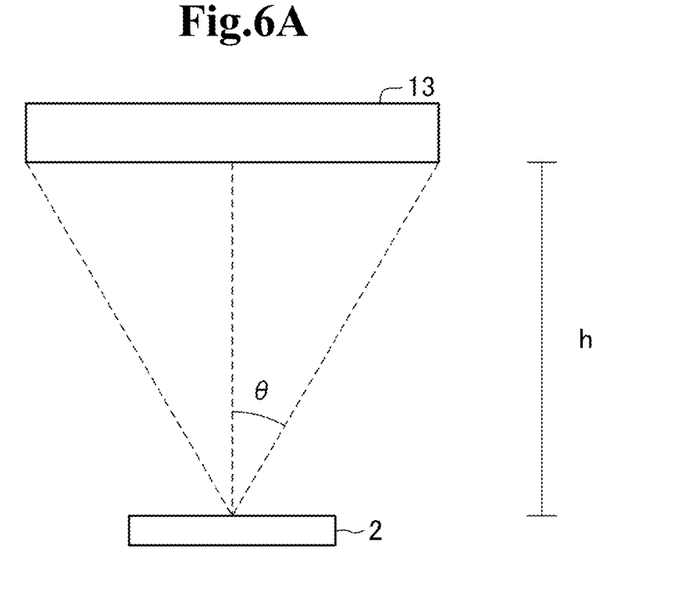
FIG. 6A is a view showing an example of the relation between a distance from an illuminating unit to an object and an irradiation solid angle.
Figure 6B:
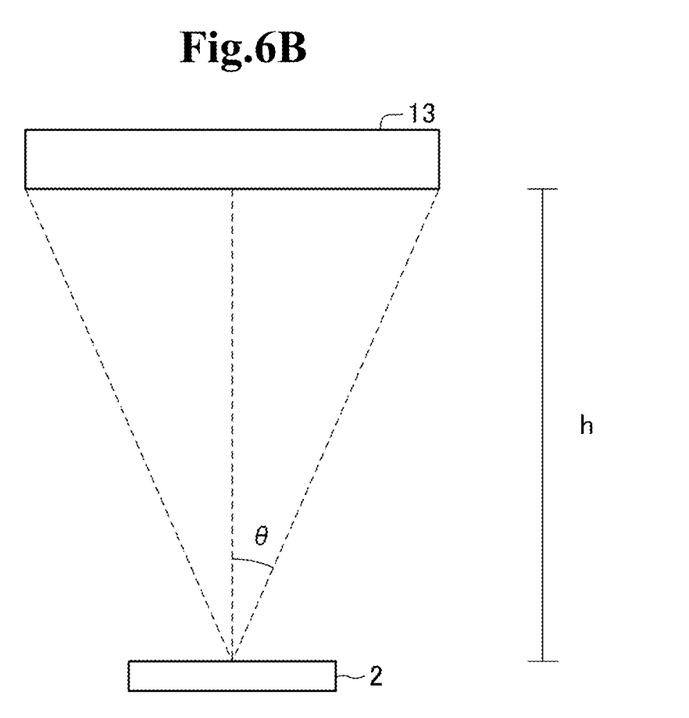
FIG. 6B is a view showing an example of the relation between a distance from an illuminating unit to an object and an irradiation solid angle.
Figure 7A:
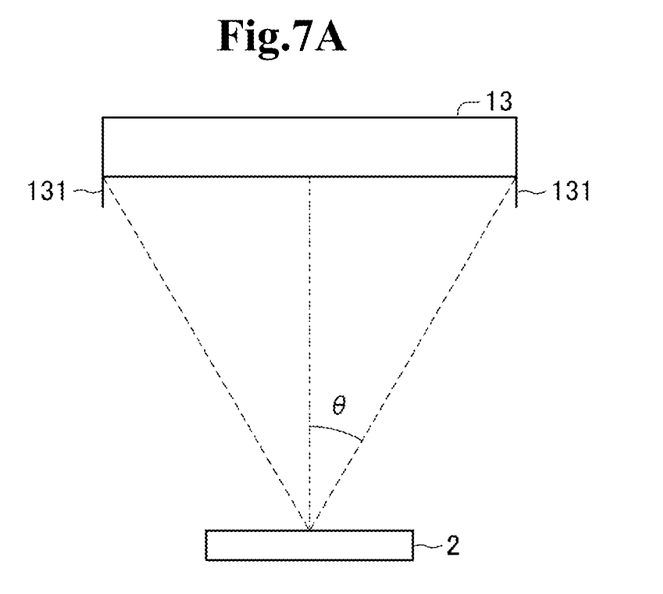
FIG. 7A is a view showing an example of an irradiation solid angle when the illuminating unit is equipped with a shielding unit.
Figure 7B:
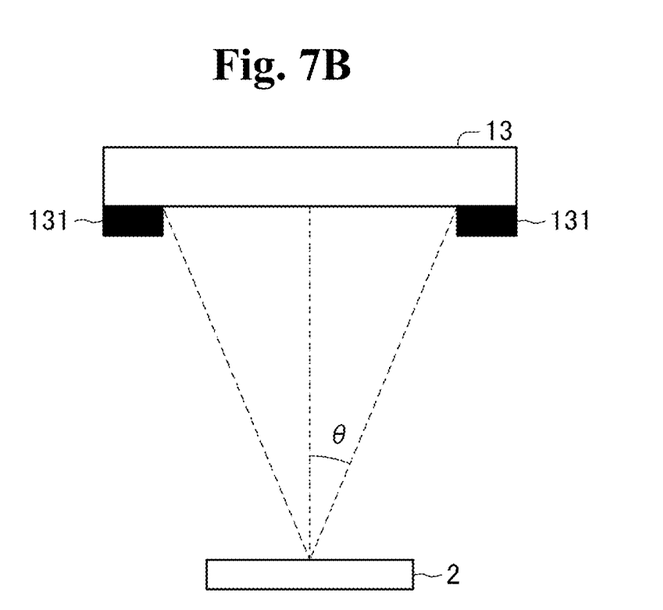
FIG. 7B is a view showing an example of an irradiation solid angle when the illuminating unit is equipped with a shielding unit.
Figure 8:
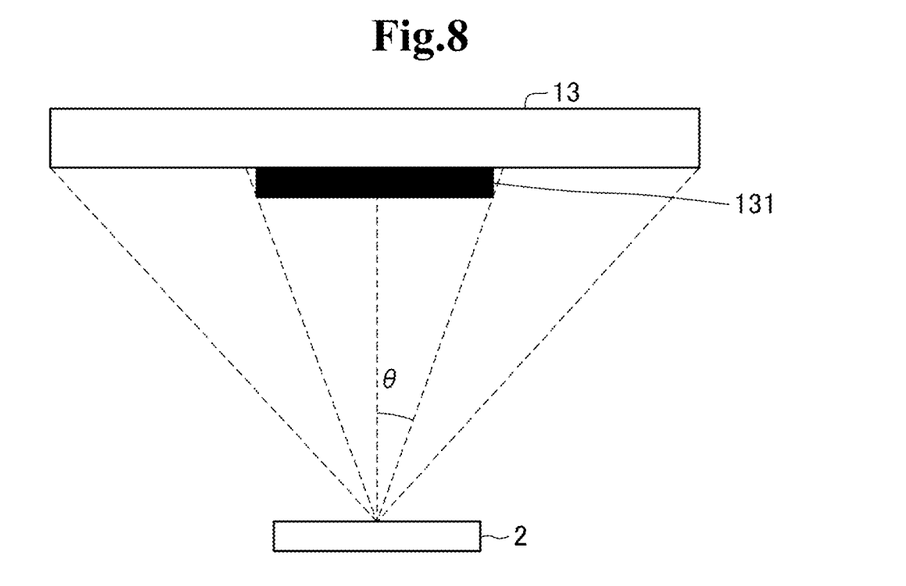
FIG. 8 is a view showing an example of the relation between the shielding unit and an irradiation angle.
Figure 9:
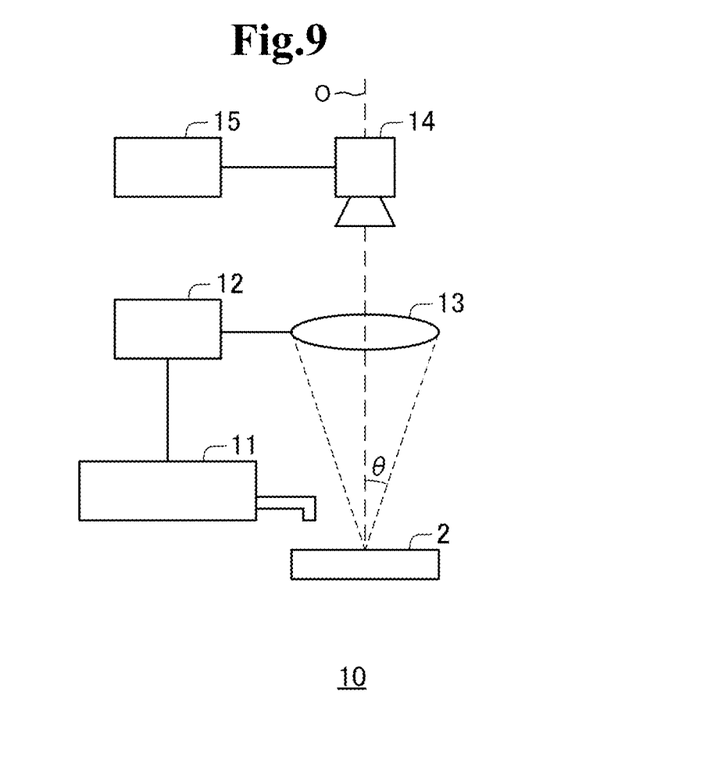
FIG. 9 is a view showing an example of the configuration of an item identification device as an example in which the present invention is applied.
Figure 10:
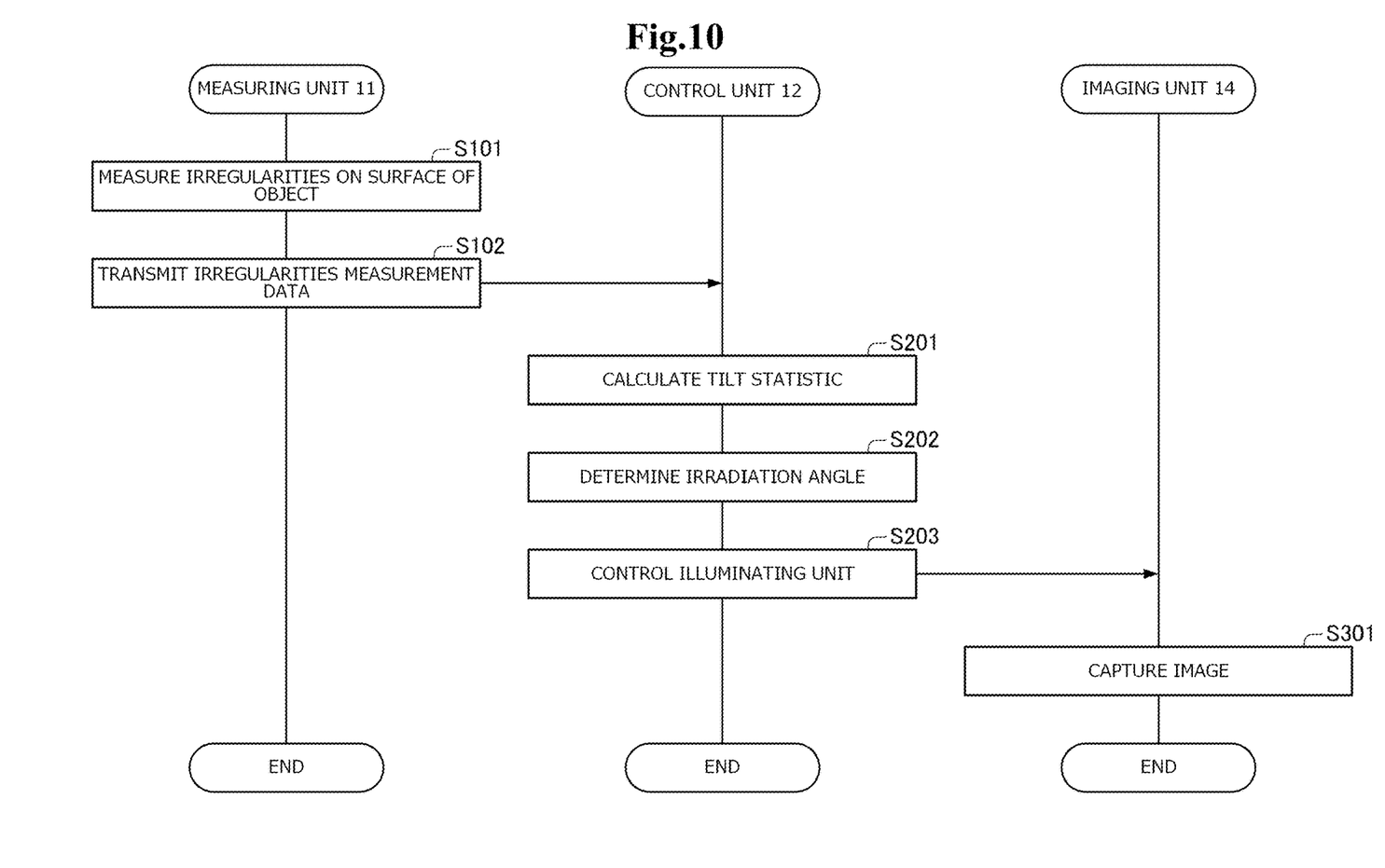
FIG. 10 is a sequence diagram showing an example of the operation of the image capture system.
Figure 11A:
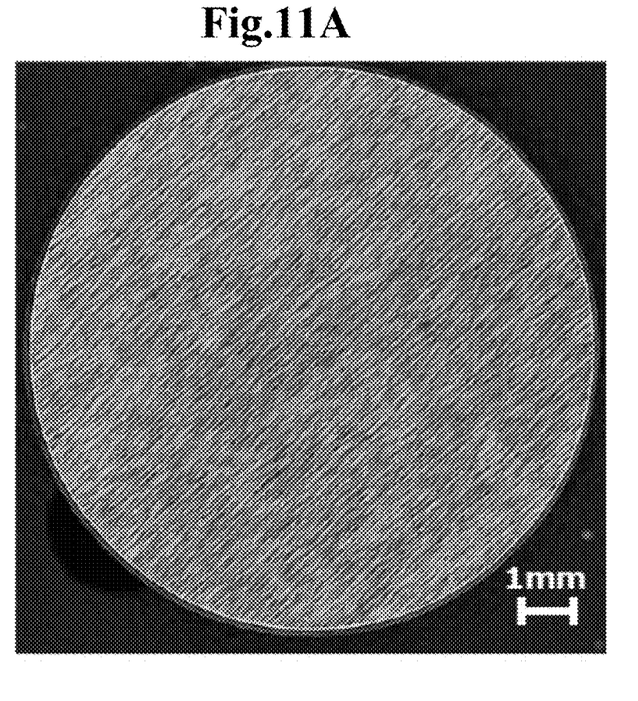
FIG. 11A is a view showing an example when the surface of the object is actually imaged when $\theta=2\alpha$.
Figure 11B:
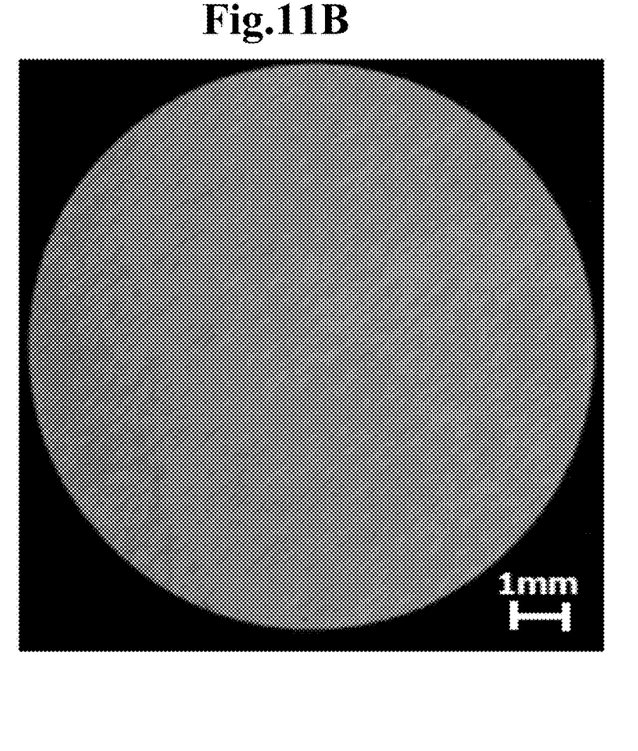
FIG. 11B is a view showing an example when the surface of the object is actually imaged when $\theta>2\alpha$.

A first example embodiment of the present invention will be described referring to FIGS. 1 to 11. FIG. 1 is a view showing an example of the overall configuration of an image capture system 1. FIG. 2 is a block diagram showing an example of the configuration of a control unit 12. FIG. 3 is a view showing an example of the relation between an irradiation angle and lightness/darkness. FIG. 4 is a view showing an example of the tilt distribution of the surface of an object 2. FIGS. 5A-5C are views showing an example of change of an irradiation angle and a captured image. FIGS. 6A-6B are views showing an example of the relation between a distance from an illuminating unit 13 to the object 2 and an irradiation solid angle. FIGS. 7A-7B are views showing an example of an irradiation solid angle when the illuminating unit 13 is equipped with a shielding unit 131. FIG. 8 is a view showing an example of the relation between the shielding unit 131 and an irradiation angle. FIG. 9 is a view showing an example of the configuration of an item identification device 10 as an example in which the present invention is applied. FIG. 10 is a flowchart showing an example of the operation of the image capture system 1. FIG. 11 is a view showing an example when the surface of the object 2 is actually imaged.

In the first example embodiment, the image capture system 1 used when performing individual identification of an identification target such as a part (for example, a mechanical part), a packing item (for example, a case), a product, or the like, will be described. The image capture system 1 in this example embodiment images the object 2 formed on an identification target in order to perform individual identification of the identification target, for example. As will be described later, the image capture system 1 in this example embodiment includes a measuring unit 11 measuring irregularities formed on the surface of the object 2, and a control unit 12 determining an irradiation angle (the range of an irradiation angle) when the illuminating unit 13 illuminates the object 2 based on the result of measurement by the measuring unit 11. However, the image capture system 1 may be used for a purpose other than individual identification.

FIG. 1 shows an example of the overall configuration of the image capture system 1 (an image capture device). Referring to FIG. 1, the image capture system 1 includes the measuring unit 11, the control unit 12, the illuminating unit 13, and an imaging unit 14. In the image capture system 1, irradiation light is emitted from the illuminating unit 13 to the object 2. Then, light reflected from the object 2 is imaged by the imaging unit 14 such as a CCD (Charge Coupled Devices) camera.

In this example embodiment, the periphery of the object 2 is covered with, for example, a black coverture part (not shown) so that light other than the irradiation light from the illuminating unit 13 does not enter the object 2. Moreover, in this example embodiment, as shown in FIG. 1, the illuminating unit 13 and the imaging unit 14 are arranged so as to have a common optical axis O right above the object 2 in the vertical direction. However, the configuration of the image capture system 1 in which a method of the present invention is applied is not limited to a case exemplified in this example embodiment. The illuminating unit 13 and the imaging unit 14 may be arranged so as to have a positional relation other than that shown in FIG. 1. Moreover, by setting the irradiance of the irradiation light from the illuminating unit 13 sufficiently higher than the irradiance of light other than the irradiation light without using the abovementioned black coverture part, the image capture system 1 may be configured so that the influence of the light other than the irradiation light can be ignored.

The measuring unit 11 measures fine irregularities formed on the surface of the object 2 and acquires irregularities measurement data of the surface of the object 2. As the measuring unit 11, for example, a contact-type measurement device such as a contact profilometer (for example, SJ-210 produced by Mitsutoyo Corporation) can be used. Alternatively, as the measuring unit 11, for example, a noncontact-type measurement device such as a confocal laser microscope (for example, VK-260 produced by Keyence Corporation) may be used. The measuring unit 11 may be any other device generally used for roughness measurement.

The measuring unit 11 is connected with the control unit 12 so as to be able to communicate. The measuring unit 11 transmits irregularities measurement data as the result of measurement to the control unit 12.

The control unit 12 is an information processing device that determines an irradiation angle that is an illumination condition when the illuminating unit 13 illuminates the object 2, based on the result of measurement by the measuring unit 11. The control unit 12 receives irregularities measurement data, which is the result of measurement of the irregularities of the surface of the object 2, from the measuring unit 11. Then, the control unit 12 determines an irradiation angle when the illuminating unit 13 illuminates the object 2 based on the received irregularities measurement data. In other words, the control unit 12 determines an angle from which the illuminating unit 13 irradiates the object 2 with light.

Referring to FIG. 2, the control unit 12 includes, for example, a transmitting/receiving unit 121, a tilt statistic calculating unit 122, an irradiation angle determining unit 123, and an illumination control unit 124. The control unit 12 has, for example, a storage unit and an arithmetic unit such as a CPU (Central Processing unit), which are not shown, and realizes the respective processing units described above by execution of a program stored in the storage unit by the arithmetic unit.

The transmitting/receiving unit 121 transmits and receives information to and from the measuring unit 11 and the illuminating unit 13.

The tilt statistic calculating unit 122 calculates a tilt statistic that is a statistic of the tilt distribution of irregularities on the surface of the object 2, based on irregularities measurement data that is the result of measurement of the irregularities on the surface of the object 2 by the measuring unit 11. In other words, the tilt statistic calculating unit 122 analyzes irregularities measurement data to calculate a tilt statistic that is a value corresponding to the tilt distribution of fine irregularities formed on the surface of the object 2. The tilt statistic calculating unit 122 can calculate, for example, a surface roughness parameter SΔq (a root-mean-square tilt angle) defined by ISO 25178 (surface roughness measurement) and use it as a tilt statistic. Alternatively, instead of the surface roughness parameter SΔq, the tilt statistic calculating unit 122 can calculate, for example, a line roughness parameter RΔq (a root-mean-square tilt angle) defined by ISO 13565-1 (line roughness measurement) for two directions (X component and Y component) orthogonal to each other and use the root mean square as the tilt static. The line roughness parameter RΔq and the surface roughness parameter SΔq that are calculated by the tilt statistic calculating unit 122 are parameters that can be generally calculated by the software of the profilometer, and can be calculated without the need for a special device, software, or the like. Therefore, the tilt statistic described above is a value that anyone can calculate in roughness measurement work generally performed in the manufacturing industry.

However, a tilt statistic calculated by the tilt statistic calculating unit 122 is not limited to the abovementioned value. For example, the tilt statistic calculating unit 122 may be configured to calculate a tilt statistic based on a value that becomes a rough indication for almost equally dividing the object 2 into two regions, such as the median or mode value of the tile distribution of irregularities on the surface of the object 2, or on any other value, not limited to the roughness parameters defined by ISO.

The irradiation angle determining unit 123 determines an irradiation angle when the illuminating unit 13 illuminates the object 2 based on a tilt statistic calculated by the tilt statistic calculating unit 122. For example, the irradiation angle determining unit 123 determines an irradiation angle by calculating the value of a planar half angle θ of an irradiation solid angle about the vertical direction of the object 2 (see FIG. 1) based on the tilt statistic. The planar half angle θ of an irradiation solid angle indicates the angle of tilt from the optical axis O as shown in FIG. 1.

To be specific, for example, the irradiation angle determining unit 123 determines an irradiation angle by calculating the planar half angle of an irradiation solid angle based on the following formula:

$$\theta = 2\alpha$$

where θ denotes a planar half angle of an irradiation angle and α denotes a tilt statistic.

The irradiation angle determining unit 123 almost doubles the tilt statistic α that is the result of calculation by the tilt statistic calculating unit 122 to find the planar half angle of the irradiation solid angle and determine an irradiation angle in the abovementioned manner, for example.

Below, the reason for executing the process as described above will be illustrated referring to FIGS. 3 to 5.

FIG. 3 is a schematic diagram of part of the irregularities on the surface of the object 2. In FIG. 3, the angle of tilt from the optical axis O of the normal line to a point P on the object surface is denoted by φ. Then, in a case where the illumination unit is located in a direction symmetrical to the optical axis O with reference to the normal line (at a tilt angle 2φ), direct light reflected at the point P enters the imaging unit 14. On the other hand, in a case where the illumination unit is not located in the direction of the tilt angle 2φ, there is no direct light that is reflected at the point P and enters the imaging unit 14. Thus, whether or not the direct light enters the imaging unit 14 is determined by the relation between the tilt angle of the surface of the object 2 and the irradiation angle to the object 2 of the illuminating unit 13. In other words, the imaging unit 14 images a lightness-darkness pattern on which tilt angles at the respective points of the irregularities on the surface of the object 2 are reflected.

In order to image a lightness-darkness pattern with high contrast, it may be imaged so that the incident area of the direct light becomes approximately one half and the lightness area and the darkness area become almost equal. For this, the irradiation angle of the illuminating unit 13 may be set so as to correspond to an almost half range of the tilt distribution. This can be realized, for example, by setting the irradiation solid angle so that the planar half angle θ about the optical axis O becomes almost twice the tilt statistic of the tilt distribution. That is to say, by controlling the illuminating unit 13 so that the planar half angle θ shown in FIG. 1 and so on becomes almost twice the tilt statistic α, it is possible to realize high-contrast imaging of a lightness-darkness pattern.

The above will be described in more detail referring to FIGS. 4 and 5A-5C. FIG. 4 shows an example of the tilt distribution of the irregularities on the surface of the object 2. FIGS. 5A-5C show an example of change of a captured image of the irradiation solid angle with reference to the planar half angle θ. To be specific, FIGS. 5A-5C show, as a one-dimensional image 31, one column or one row of an image captured by the imaging unit 14 when the planar half angle θ of the irradiation solid angle (see FIG. 1) is changed to θ<2α, θ=2α, and θ>2α. FIGS. 5A-5C also show a cross section 32 showing an example of the irregularities on the surface of the object 2 together with the one-dimensional image 31. In other words, FIG. 5A shows an example of a lightness-darkness pattern in the case of θ<2α, and FIG. 5B shows an example of a lightness-darkness pattern in the case of θ=2α. FIG. 5C shows an example of a lightness-darkness pattern in the case of θ>2α.

Referring to FIG. 4, the tilt statistic substantially halves the area of a graph shown in FIG. 4. That is, if the tilt statistic is set to α, the area of a region of the object 2 where the angle φ of tilt from the optical axis O is smaller than α (φ<α) is almost equal to the area of a region of the object 2 where φ is larger than α (φ>α). In other words, the tilt statistic α is a value that substantially equally divides the object 2 into two regions. Therefore, if the irradiation solid angle of the plane half angle θ about the optical axis O is 2α, it is possible to obtain a desired lightness-darkness pattern in which the incident area of the direct light is almost one half. On the other hand, if the state departs from a state of almost equal to θ=2α, the contrast of the lightness-darkness pattern decreases.

That is, as shown in FIG. 5B, when θ=2α, the area of φ<θ/2(α) and the area of φ>θ/2 are almost equal, so that in the one-dimensional image 31, the area of lightness and the area of darkness are almost equal. On the other hand, as shown in FIG. 5A, when θ<2α, the area of darkness is larger than the area of lightness, and the contrast of the image is reduced. As shown in FIG. 5C, when θ>2α, the area of lightness is larger than the area of darkness, and the contrast of the image is reduced. This is because, as described above, with respect to the tilt angle of φ=θ/2 (the tilt angle 33 of FIG. 5), the direct light enters the imaging unit 14 from a point where the tilt angle φ<θ/2, and the direct light does not enter from a point where the tilt angle φ>θ/2. When it is extremely away from θ=2α, the one-dimensional image 31 is all dark or all light, and a lightness-darkness pattern cannot be captured.

Because of the reason as described above, the irradiation angle determining unit 123 determines an irradiation angle by almost doubling the tilt statistic α that is the result of calculation by the tilt statistic calculation angle.

The illumination control unit 124 controls the illuminating unit 13 and so on so that the planar half angle θ of the irradiation solid angle when the illuminating unit 13 emits light to the object 2 becomes approximately 2α. The illumination control unit 124 controls, for example, the distance between the illuminating unit 13 and the object 2 and the range of shielding by the shielding unit 131 such as a diaphragm formed on the illuminating unit 13 so that the planar half angle θ of the irradiation solid angle becomes 2α. In other words, the illumination control unit 124 controls the distance between the illuminating unit 13 and the object 2, the range of shielding by the shielding unit 131 formed on the illuminating unit 13, and so on, so that the illuminating unit 13 makes direct light enter the object 2 from a range that the planar half angle θ of the irradiation solid angle is 0 to 2α degrees. Meanwhile, the illumination control unit 124 may control the planar half angle θ of the irradiation solid angle using a method other than the exemplified above.

For example, FIGS. 6A-6B show an example of the relation between a distance h from the illuminating unit 13 to the object 2 and the planar half angle θ of the irradiation solid angle. To be specific, FIG. 6A shows an example of the planar half angle θ of the irradiation solid angle in a case where the distance h between the illuminating unit 13 and the object 2 is a certain value, and FIG. 6B shows an example of the planar half angle θ in a case where the distance h between the illuminating unit 13 and the object 2 becomes longer than that shown in FIG. 6A. Referring to FIGS. 6A-6B, it can be found that the value of the planar half angle θ of the irradiation solid angle becomes larger as the distance h between the illuminating unit 13 and the object 2 becomes shorter, whereas the value of the planar half angle θ of the irradiation solid angle becomes smaller as the distance h between the illuminating unit 13 and the object 2 becomes longer. Thus, it is possible to control the value of the planar half angle θ of the irradiation solid angle by controlling the distance between the illuminating unit 13 and the object 2.

Further, FIGS. 7A-7B show an example of the irradiation solid angle when the illuminating unit 13 is equipped with the shielding unit 131. To be specific, FIG. 7A shows an example of the irradiation solid angle when the illuminating unit 13 is equipped with the shielding unit 131, and FIG. 7B shows an example of the irradiation solid angle when the shielding unit 131 is used to shield a broader range than in FIG. 7A (for example, a diaphragm is narrowed down). Referring to FIGS. 7A-7B, it can be found that the value of the planar half angle θ becomes smaller when the range shielded by the shielding unit 131 is made to be broader by narrowing down the diaphragm. Thus, it is also possible to control the value of the planar half angle θ of the irradiation solid angle by the method of controlling the shielding nit 131.

The illumination control unit 124 controls the planar half angle θ of the irradiation solid angle by using any of the abovementioned units or a combination of the abovementioned units, or any of known units other than the abovementioned units or a combination thereof.

Alternatively, for example, as shown in FIG. 8, the illumination control unit 124 may control the illuminating unit 13 so that a range where the planar half angle θ is from 0 to 2α is dark and a range where the planar half angle θ is equal to or more than 2α (equal to or less than 90 degrees at the maximum) is light. In other words, the irradiation angle determining unit 123 may be configured to determine the irradiation angle by calculating the range of angles at which the illuminating unit 13 does not cause direct light to enter the object 2. The control as described above by the illumination control unit 124 is adopted, for example, in the case of using a dome light, a ring light, or the like, as the illuminating unit 13. In the case of executing such control, it is possible to control the planar half angle θ by controlling the distance from the illuminating unit 13 to the object 2 and the range of shielding by the shielding unit 131 as in the cases shown in FIGS. 6 and 7. Meanwhile, in a case where the illumination control unit 124 controls the illuminating unit 13 so that a range where the planar half angle θ is equal to or more than 2α degrees (equal to or less than 90 degrees at the maximum) is light, the illumination control unit 124 does not necessarily need to control the illuminating unit 13 until the upper limit of the light range becomes 90 degrees. This is because a region where the tilt angle is extremely away from 2α is less frequent in FIG. 4, the contrast does not largely change depending on the lightness/darkness of the region, and an image pattern can be captured without any problem. A value to become the upper limit in the case of controlling the illuminating unit 13 so that the range where the planar half angle θ is 2α degrees or more (90 degrees or less at the maximum) is light may be previously set to, for example, 70 degrees or 80 degrees, or may be calculated according to irregularities measurement data or the like.

The above is an example of the configuration of the control unit 12. However, the configuration of the control unit 12 is not limited to the example described above.

For example, the function as the tilt statistic calculating unit 122 included by the control unit 12 may be included by the measuring unit 11. That is, the control unit 12 may be configured to receive a tilt statistic calculated by the measuring unit 11. In this case, the control unit 12 may not include the tilt statistic calculating unit 122.

Further, the function as the illumination control unit 124 included by the control unit 12 may be included by the illuminating unit 13. That is, the control unit 12 may be configured to transmit an irradiation angle determined by the irradiation angle determining unit 123 to the illuminating unit 13. In this case, the control unit 12 may not have the illumination control unit 124.

The control unit 12 may be configured to, for example, transmit an irradiation angle determined by the irradiation angle determining unit 123 to a screen display part such as an LCD (liquid crystal display; not shown) or an external information processing device. In this case, control of the illuminating unit 13 may be manually executed by the operator, for example.

Thus, the control unit 12 may be configured to, for example, determine an angle of irradiation to the object 2 by the illuminating unit 13 based on a tilt statistic received from the measuring unit 11 and transmit the determined irradiation angle to the illuminating unit 13.

The illuminating unit 13 (an illumination device) applies light to the object 2 from an irradiation angle determined by the control unit 12. That is, the illuminating unit 13 realizes an illumination condition determined by the control unit 12. The illuminating unit 13 can be connected with the control unit 12 and the imaging unit 14 so as to be able to communicate. The illuminating unit 13 is, for example, a coaxial epi-illumination light (for example, LV-27 or LFV3 manufactured by CCS Inc.). The illuminating unit 13 may be a dome light, a ring light, or the like. The illuminating unit 13 may have the shielding unit 131 such as a diaphragm.

The illuminating unit 13 can be configured in a manner that an irradiation solid angle can be controlled manually or under control by the control unit 12. In this example embodiment, a configuration for controlling an irradiation solid angle is not limited specifically. For example, the illuminating unit 13 may be configured in a manner that multiple illuminating units with different irradiation solid angles are used depending on an irradiation solid angle determined by the control unit 12. Alternatively, the illuminating unit 13 can have a known configuration for controlling an irradiation solid angle.

The imaging unit 14 is configured by, for example, a camera using a CCD sensor, a CMOS (Complementary Metal Oxide) image sensor, or the like. The imaging unit 14 can be connected to the control unit 12 and the illuminating unit 13 so as to be able to communicate. The imaging unit 14 images the object 2 in a state that the object 2 is illuminated by the illuminating unit 13. In other words, the imaging unit 14 images the object 2 in a state of using the illuminating unit 13. Image data captured by the imaging unit 14 may be a color image or may be a monochrome image.

Further, the imaging unit 14 can be connected to a screen display part such as an LCD, an external information processing device having an image processing part, or the like, which are not shown. Then, the imaging unit 14 can be configured to transmit the captured image data to the screen display part or the external information processing device.

For example, as shown in FIG. 9, the imaging unit 14 can be configured to transmit captured image data to a collating device 15 (an external information processing device that is not shown in FIG. 1), which is a collating unit executing a collation process based on captured image data. The collating device 15 executes a process of identification/collation of an object by comparing information extracted from acquired image data with previously stored information. For example, the collating device 15 extracts a feature point that is a characteristic point on an edge, a corner, or the like, based on received image data, or extracts a local feature value that is a feature value with respect to the extracted feature point from the feature point and pixel values of pixels around of the feature point. Then, the collating device 15 compares the extracted feature point or local feature value with previously stored information (a previously stored feature point or local feature value) and, based on the result of comparison, performs identification/collation of the object. The imaging unit 14 can be configured to transmit captured image data to the collating device 15 performing such a collation process. In other words, the present invention can be applied to the item identification device 10 that includes the image capture system 1 (an image capture device) and the collating device 15 executing a predetermined collation process based on an image captured by the image capture system 1. However, the abovementioned collation process merely illustrates an example. The collating device 15 may perform the collation process by a method other than illustrated above. Moreover, for example, the function as the collating device 15 may be included by the control unit 12. That is, the item identification device 10 may include one information processing device that has the function as the control unit 12 and the function as the collating device 15, instead of the control unit 12 and the collating device 15.

The above is an example of the configuration of the image capture system 1. The object 2 imaged by the image capture system 1 is formed on an identification target such as a part (for example, a mechanical part), a packing item (for example, a case), or a product. In this example embodiment, the configuration of the object 2 is not limited specifically.

Subsequently, referring to FIG. 10, an example of the operation of the image capture system 1 will be described.

Referring to FIG. 10, the measuring unit 11 measures irregularities on the surface of the object 2 to acquire irregularities measurement data (step S101). The measuring unit 11 transmits the acquired irregularities measurement data to the control unit 12 (step S102).

The tilt statistic calculating unit 122 of the control unit 12 calculates a tilt statistic that is the statistic of tilt distribution from the irregularities measurement data (step S201). As a tilt statistic, a value based on a line roughness parameter R$\Delta$q defined by ISO 13565-1 (line roughness measurement), a surface roughness parameter S$\Delta$q defined by ISO 25178 (surface roughness measurement), or the like, can be used.

The irradiation angle determining unit 123 determines an irradiation angle by determining the planar half angle θ of an irradiation solid angle based on the tilt statistic calculated by the tilt statistic calculating unit 122 (step S202). For example, the irradiation angle determining unit 123 calculates a value obtained by almost doubling the tilt statistic as the planar half angle θ of an irradiation solid angle.

The illumination control unit 124 controls the illuminating unit 13 based on the irradiation angle determined by the irradiation angle determining unit 123 (step S203). For example, the illumination control unit 124 controls a distance between the illuminating unit 13 and the object 2, a range shielded by the shielding unit 131 formed on the illuminating unit 13, or the like, so that the illuminating unit 13 causes direct light to enter the object 2 from a range where the planar half angle θ of an irradiation solid angle is 0 to 2α degrees.

Further, the illumination control unit 124 can be configured to notify the imaging unit 14 that control of illumination has finished. Notification to the imaging unit 14 may be performed by the illuminating unit 13.

After control by the illumination control unit 124 ends, the imaging unit 14 captures an image at a timing that the illuminating unit 13 illuminates the object 2 (step S301). Meanwhile, image capture by the imaging unit 14 may be performed manually.

The above is an example of the operation of the image capture system 1. As stated above, the process of step 201 may be performed by the measuring unit 11. The process of step S203 may be performed by the illuminating unit 13.

Thus, the image capture system 1 according to this example embodiment includes the measuring unit 11 and the control unit 12. The control unit 12 includes the tilt statistic calculating unit 122 and the irradiation angle determining unit 123. With such a configuration, the tilt statistic calculating unit 122 can calculate a tilt statistic based on the result of measurement by the measuring unit 11. The irradiation angle determining unit 123 can determine an irradiation angle when the illuminating unit 13 illuminates the object 2 based on the tilt statistic calculated by the tilt statistic calculating unit 122. As state above, when the object 2 is imaged by the imaging unit 14 in a state that the illuminating unit 13 illuminates from the irradiation angle determined by the irradiation angle determining unit 123, an image with high contrast can be acquired. That is, with the configuration described above, it is possible to easily acquire an image with high contrast.

Actual examples of an image of the surface of the object 2 captured using the image capture system 1 are shown in FIGS. 11A-11B. FIG. 11A shows an example of a captured image when $\theta=2\alpha$, and FIG. 11B shows an example of a captured image when $\theta>2\alpha$. Referring to FIG. 11A, it is found that in the captured image when $\theta=2\alpha$, the contrast is high and a clear lightness-darkness pattern is obtained. On the other hand, referring to FIG. 11B, it is found that in the captured image when $\theta>2\alpha$, the contrast is low compared with the captured image shown in FIG. 11A and a clear lightness-darkness pattern is not obtained. Thus, it is found that an image with high contrast can be acquired using the imaging unit 14 by controlling the illuminating unit 13 to planar half angle $\theta$=almost $2\alpha$.

Second Example Embodiment

Next, referring to FIG. 12, a second example embodiment of the present invention will be described. In the second example embodiment, the overview of the configuration of an information processing device 4 used in an image capture device that illuminates an object with an illuminating unit and images light reflected from the object as a reflection image with an imaging unit will be described.

Figure 12:
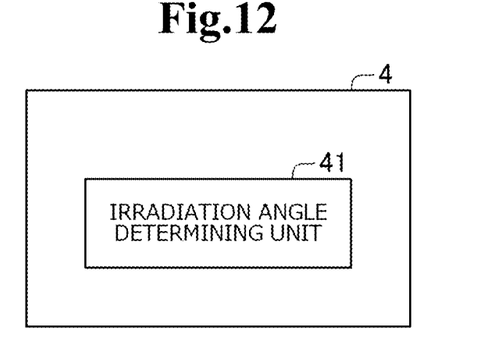
FIG. 12 is a view showing an example of the configuration of an information processing device according to a second example embodiment of the present invention.

Referring to FIG. 12, the information processing device 4 includes an irradiation angle determining unit 41. For example, the information processing device 4 includes a storage unit and an arithmetic logic unit such as a CPU, which are not shown, and realizes the processing units described above by execution of a program stored in the storage unit by the arithmetic logic unit.

The irradiation angle determining unit 41 determines an irradiation angle when the illuminating unit illuminates an object based on a tilt statistic that is a value corresponding to the tilt distribution of fine irregularities formed on the surface of an object. For example, the irradiation angle determining unit 41 receives a tilt statistic from an external image processing device, or the like. Then, the irradiation angle determining unit 41 determines an irradiation angle when the illuminating unit illuminates an object based on the received tilt statistic.

Thus, the information processing device in this example embodiment includes the irradiation angle determining unit 41. With such a configuration, the irradiation angle determining unit 41 of the information processing device 4 can determine an irradiation angle when the illuminating unit illuminates an object based on a tilt statistic received from an external information processing device or the like. Consequently, it becomes possible to easily calculate an irradiation angle necessary for acquiring an image with high contrast, and it becomes possible to easily acquire an image with high contrast.

Further, the information processing device 4 described above can be realized when a predetermined program is installed in the information processing device 4. To be specific, a program according to another aspect of the present invention is a program including instructions for causing an information processing device 4 to realize an irradiation angle determining unit. The information processing device 4 is used in an image capture device that illuminates an object with an illuminating unit and images light reflected from the object as a reflection image with an imaging unit. The irradiation angle determining unit determines an irradiation angle when the illuminating unit illuminates the object based on a tilt statistic that is a value corresponding to the tilt distribution of irregularities formed on the surface of the object.

Further, an information processing method executed by the information processing device 4 described above is a method that an information processing device used in an image capture device illuminating an object with an illuminating unit and imaging light reflected by the object as a reflected image with an imaging unit acquires a tilt statistic that is a value corresponding to the tilt distribution of irregularities formed on the surface of an object and, based on the acquired tilt statistic, determines an irradiation angle when the illuminating unit illuminates an object.

The inventions of the program and the information processing method with the configurations described above have the same actions as the information processing device 4 and therefore can achieve the abovementioned object of the present invention.

<Supplementary Notes>

The whole or part of the example embodiments disclosed above can be described as the following supplementary notes. Below, the overview of the information processing device according to the present invention will be described. However, the present invention is not limited to the following configurations.

(Supplementary Note 1)

An information processing device used in an image capture device that illuminates an object with an illuminating unit and images light reflected from the object as a reflection image with an imaging unit, the information processing device comprising an irradiation angle determining unit configured to determine an irradiation angle when the illuminating unit illuminates the object based on a tilt statistic that is a value corresponding to tilt distribution of (fine) irregularities formed on a surface of the object.

(Supplementary Note 2)

The information processing device according to Supplementary Note 1, wherein the irradiation angle determining unit calculates a planar half angle of an irradiation solid angle about a vertical direction of the object based on the tilt statistic and thereby determines the irradiation angle.

(Supplementary Note 3)

The information processing device according to Supplementary Note 2, wherein the irradiation angle determining unit calculates a value almost twice the tilt statistic as the planar half angle of the irradiation solid angle.

(Supplementary Note 4)

The information processing device according to any of Supplementary Notes 1 to 3, wherein the irradiation angle determining unit calculates a range of angles that the illuminating unit does not cause direct light to enter the object and thereby determines an irradiation angle when the illuminating unit illuminates the object.

(Supplementary Note 5)

The information processing device according to any of Supplementary Notes 1 to 4, further comprising a tilt statistic calculating unit configured to calculate a tilt statistic that is a value corresponding to tilt distribution of irregularities formed on a surface of the object based on a result of measurement of irregularities formed on a surface of the object, wherein the irradiation angle determining unit determines the irradiation angle based on the tilt statistic calculated by the tilt statistic calculating unit.

(Supplementary Note 6)

The information processing device according to Supplementary Note 5, wherein the tilt statistic calculating unit calculates a value of a tilt almost equally dividing the object into two regions as the tilt statistic.

(Supplementary Note 7)

The information processing device according to Supplementary Note 5 or 6, wherein the tilt statistic calculating unit calculates a root-mean-square tilt angle as the tilt statistic.

(Supplementary Note 8)

The information processing device according to any of Supplementary Notes 1 to 7, further comprising a measuring unit configured to measure irregularities formed on a surface of the object, wherein the tilt statistic is a value calculated based on a result of measurement by the measuring unit.

(Supplementary Note 9)

An information processing method executed by an information processing device used in an image capture device that illuminates an object with an illuminating unit and images light reflected from the object as a reflection image with an imaging unit, the information processing method comprising acquiring a tilt statistic that is a value corresponding to tilt distribution of irregularities formed on a surface of the object and, based on the acquired tilt statistic, determining an irradiation angle when the illuminating unit illuminates the object.

(Supplementary Note 10)

A program comprising instructions for causing an information processing device to realize an irradiation angle determining unit, the information processing device being used in an image capture device that illuminates an object with an illuminating unit and images light reflected from the object as a reflection image with an imaging unit, the irradiation angle determining unit being configured to determine an irradiation angle when the illuminating unit illuminates the object based on a tilt statistic that is a value corresponding to tilt distribution of irregularities formed on a surface of the object.

(Supplementary Note 11)

An image capture device comprising:

the information processing device according to any of Supplementary Notes 1 to 8;

an illuminating device configured to realize an illumination condition determined by the information processing device; and an imaging unit including the illuminating device.

(Supplementary Note 11-1)

An image capture method executed by an image capture device that includes an information processing device used in an image capture device that illuminates an object with an illuminating unit and images light reflected from the object as a reflection image with an imaging unit, an illuminating device configured to realize an illumination condition determined by the information processing device, and an imaging unit including the illuminating device, the image capture method comprising acquiring a tilt statistic that is a value corresponding to tilt distribution of irregularities formed on a surface of the object and, based on the acquired tilt statistic, determining an irradiation angle when the illuminating unit illuminates the object.

(Supplementary Note 12)

An item identification device comprising:

the image capture device according to Supplementary Note 11; and a collating device configured to perform a predetermined collation process based on an image captured by the image capture device.

(Supplementary Note 12-1)

An item identification method executed by an item identification device that includes an information processing device used in an image capture device that illuminates an object with an illuminating unit and images light reflected from the object as a reflection image with an imaging unit, an illuminating device configured to realize an illumination condition determined by the information processing device, an imaging unit including the illuminating device, and a collating device configured to perform a predetermined collation process based on an image captured by the image capture device, the item identification method comprising acquiring a tilt statistic that is a value corresponding to tilt distribution of irregularities formed on a surface of the object and, based on the acquired tilt statistic, determining an irradiation angle when the illuminating unit illuminates the object.

The programs described in the above example embodiments and supplementary notes are each stored in a storage device or recorded on a computer-readable recoding medium. For example, the recording medium is a portable medium such as a flexible disk, an optical disk, a magneto-optical disk, or a semiconductor memory.

Although the present invention has been described referring to the above example embodiments, the present invention is not limited to the above example embodiments. The configuration and details of the present invention can be changed in various manners that can be understood by one skilled in the art within the scope of the present invention.

DESCRIPTION OF NUMERALS

1 image capture system
10 item identification device
11 measuring unit
12 control unit
121 transmitting/receiving unit
122 tilt statistic calculating unit 123 irradiation angle determining unit
124 illumination control unit
13 illuminating unit
131 shielding unit
14 imaging unit
15 collating device
2 object
31 one-dimensional image
32 cross-section
33 tilt angle
4 information processing device
41 irradiation angle determining unit

The invention claimed is:

1. An information processing device used in an image capture device that illuminates an object with an illuminating unit and images light reflected from the object as a reflection image with an imaging unit,
the information processing device comprising:
a processor; and
memory storing executable instructions that, when executed by the processor, causes the processor to perform as:
an irradiation angle determining unit configured to acquire a value based on a surface roughness parameter or a line roughness parameter, the value being a tilt statistic that is a value corresponding to tilt distribution of irregularities formed on a surface of the object and being calculated based on irregularities measurement data of the surface of the object, and determine an irradiation angle when the illuminating unit illuminates the object on a basis of the tilt statistic, wherein
the irradiation angle determining unit determines the irradiation angle corresponding to an almost half range of the tilt distribution indicated by the tilt statistic such that a lightness area and a darkness area become almost equal, on a basis of the tilt statistic;
the irradiation angle determining unit calculates a planar half angle of an irradiation solid angle about a vertical direction of the object based on the tilt statistic and thereby determines the irradiation angle;
the irradiation angle determining unit calculates a value almost twice the tilt statistic as the planar half angle of the irradiation solid angle; and
the irradiation angle determining unit calculates a range of angles that the illuminating unit does not cause direct light to enter the object and thereby determines an irradiation angle when the illuminating unit illuminates the object.

2. The information processing device according to claim 1, wherein the processor further causes the processor to perform as:
a tilt statistic calculating unit configured to calculate a tilt statistic that is a value corresponding to tilt distribution of irregularities formed on a surface of the object based on a result of measurement of irregularities formed on a surface of the object,
wherein the irradiation angle determining unit determines the irradiation angle based on the tilt statistic calculated by the tilt statistic calculating unit.

3. The information processing device according to claim 2, wherein the tilt statistic calculating unit calculates a value of a tilt almost equally dividing the object into two regions as the tilt statistic.

4. The information processing device according to claim 2, wherein the tilt statistic calculating unit calculates a root-mean-square tilt angle as the tilt statistic.

5. The information processing device according claim 1, wherein the processor further causes the processor to perform as:
a measuring unit configured to measure irregularities formed on a surface of the object,
wherein the tilt statistic is a value calculated based on a result of measurement by the measuring unit.

6. The information processing device according to claim 1, further comprising:
an illuminating device configured to realize an illumination condition determined by the information processing device; and
an imaging unit including the illuminating device.

7. The information processing device according to claim 1, wherein the processor further causes the processor to perform as:
a collating device configured to perform a predetermined collation process based on an image captured by the image capture device.

8. An information processing method executed by an information processing device used in an image capture device that illuminates an object with an illuminating unit and images light reflected from the object as a reflection image with an imaging unit,
the information processing method comprising:
acquiring a value based on a surface roughness parameter or a line roughness parameter, the value being a tilt statistic that is a value corresponding to tilt distribution of irregularities formed on a surface of the object and being calculated based on irregularities measurement data of the surface of the object, and determining an irradiation angle when the illuminating unit illuminates the object on a basis of the tilt statistic, wherein
the irradiation angle corresponds to an almost half range of the tilt distribution indicated by the tilt statistic such that a lightness area and a darkness area become almost equal, on a basis of the tilt statistic;
the method further comprising:
calculating a planar half angle of an irradiation solid angle about a vertical direction of the object based on the tilt statistic and thereby determining the irradiation angle;
calculating a value almost twice the tilt statistic as the planar half angle of the irradiation solid angle; and
calculating a range of angles that the illuminating unit does not cause direct light to enter the object and thereby determining an irradiation angle when the illuminating unit illuminates the object.

9. A non-transitory computer-readable medium storing a program comprising instructions for causing an information processing device to perform as:
an irradiation angle determining unit configured to acquire a value based on a surface roughness parameter or a line roughness parameter, the value being a tilt statistic that is a value corresponding to tilt distribution of irregularities formed on a surface of the object and being calculated based on irregularities measurement data of the surface of the object, and determine an irradiation angle when the illuminating unit illuminates the object on a basis of the tilt statistic, wherein
the irradiation angle determining unit determines the irradiation angle corresponding to an almost half range of the tilt distribution indicated by the tilt statistic such that a lightness area and a darkness area become almost equal, on a basis of the tilt statistic;
the irradiation angle determining unit calculates a planar half angle of an irradiation solid angle about a vertical direction of the object based on the tilt statistic and thereby determines the irradiation angle;

the irradiation angle determining unit calculates a value almost twice the tilt statistic as the planar half angle of the irradiation solid angle; and the irradiation angle determining unit calculates a range of angles that the illuminating unit does not cause direct light to enter the object and thereby determines an irradiation angle when the illuminating unit illuminates the object.

* * * * *